United States Patent [19]

Takashima et al.

[11] Patent Number: 5,698,023
[45] Date of Patent: Dec. 16, 1997

[54] PROCESS OF PRODUCING COPPER PHTHALOCYANINE PIGMENT HAVING A BRIGHT TONE

[75] Inventors: Tsutomu Takashima; Kikuo Sasaki, both of Kanagawa; Hideyuki Dohi, Yokohama, all of Japan

[73] Assignee: Nippon Petrochemical Co., Ltd., Tokyo, Japan

[21] Appl. No.: 617,154

[22] Filed: Mar. 18, 1996

[30] Foreign Application Priority Data

Mar. 20, 1995 [JP] Japan .............. HEI 7-085917

[51] Int. Cl.$^6$ .............................. C09B 67/50
[52] U.S. Cl. .............. 106/410; 106/411; 106/493
[58] Field of Search .................... 106/410, 411, 106/493

[56] References Cited

U.S. PATENT DOCUMENTS

| | | | |
|---|---|---|---|
| 4,140,695 | 2/1979 | Takeuchi et al. | 540/141 |
| 5,318,623 | 6/1994 | Azuma et al. | 106/410 |

FOREIGN PATENT DOCUMENTS

| | | |
|---|---|---|
| 49-63735 | 6/1974 | Japan . |
| 49-116121 | 11/1974 | Japan . |

*Primary Examiner*—Mark L. Bell
*Assistant Examiner*—Scott L. Hertzog
*Attorney, Agent, or Firm*—Fisher, Christen & Sabol

[57] ABSTRACT

This invention provides a process for producing copper phthalocyanine pigments which comprises reacting either phthalic anhydride or its derivatives with urea and a copper-containing substance, or either phthalonitrile or its derivative with a copper-containing substance in a reaction solvent by heating characterized in that an alkylxylene ingredient having a branched C4 side-chain represented by the following formula (1) is used as the reaction solvent:

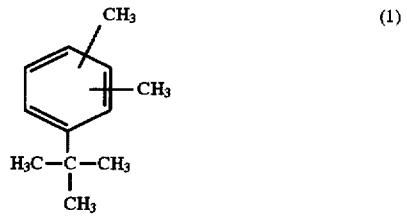

1 Claim, No Drawings

PROCESS OF PRODUCING COPPER PHTHALOCYANINE PIGMENT HAVING A BRIGHT TONE

BACKGROUND OF THE INVENTION

1. Field of the Invention

The present invention relates to a process for producing copper phthalocyanine pigments which have a bright color tone and are industrially significant.

2. Prior Art

Copper phthalocyanine pigment has been widely used in the field of the dye material industry and a barge quantity has been produced because it has a beautiful color tone and a satisfactory adhesive strength, and is excellent in weather resistance, heat resistance, solvent resistance and chemical resistance and the like.

Although various processes have been suggested for synthesizing copper phthalocyanine which is a useful pigment, there have mostly been used as an industrial process (1) a phthalic solvent process in which either phthalic acid, phthalic anhydride, phthalimide or the like is reacted with urea and either copper or a cuprous salt in an inert solvent and (2) a nitrile solvent process in which phthalonitrile is reacted with copper or a cuprous salt in an inert solvent. The other processes include, for example, (3) one in which orthocyanobenzamide is reacted with copper or a cuprous salt and (4) another in which metal-free phthalocyanine is reacted with a cuprous salt.

Heretofore, chlorobenzenes (for example, U.S. Pat. No. 4,140,695) and the like have been used as a solvent for these reaction, but at the same time various improvements have been made to these solvents so that the working environment where those solvents are used would be protected from an odor etc. attributed to those halogenated solvents. As one of the improvements, use of a reactive solvent containing no halogen has been suggested, for example, Japanese Patent Application Laid-Open No. 49-63735 discloses the use of diisopropyltoluene or a mixed solvent of diisopropyltoluene, which is a main component, and others and Japanese Patent Application Laid-Open No. 49-116121 discloses use of polyalkylbenzenes as a solvent which have a boiling point in a temperature range of 160°–250° C., and moreover, have on its benzene nucleus a substituent consisting of 2 or more of lower alkyl groups containing at least one isopropyl group.

In production of copper phthalocyanine pigment, it is necessary to secure reaction temperature sufficiently high to produce the pigment, to use a solvent having a sufficient solvency of ingredients, such as phthalic anhydride and phthalonitrile, or intermediate products of the pigment synthesis, and to smoothly separate the pigment produced and the solvent used when the reaction is completed.

Industrially, the separation process is commonly carried out by distilling a reaction solvent. In order to conduct this separation easily and economically, it is necessary that the reaction solvent used for production of the pigment should not have so wide a range of boiling point and so high a boiling point.

However, in the above-mentioned processes which have been suggested up to now, when the boiling point of the solvent is too low, it becomes necessary to set the pressurizing conditions during the production of the pigment so as to secure an improved solubility and a sufficient reaction temperature. On the other hand, when the boiling point is too high, it becomes necessary to apply an excessive heat and excessively reduced pressure during the recovery of the solvent.

Further, yield and brightness of the pigment obtained have not been necessarily satisfactory.

SUMMARY OF THE INVENTION

Therefore, an object of the present invention is to provide a reaction solvent for producing copper phthalocyanine pigment and a process for producing a copper phthalocyanine pigment which solve the problems the prior arts have, do not require any pressurizing conditions during the reaction, realize a high yield of the pigment and allow the pigment to have a bright color tone and consequently is suitable for industrial mass-production.

After careful consideration of the reaction solvents suitable for the production of a pigment, the present inventors have found a solvent which has better properties than those which have heretofore been suggested, and have completed the present invention.

The first aspect of the present invention relates to a process for producing copper phthalocyanine pigments which comprises reacting either phthalic anhydride or its derivatives with urea and a copper-containing substance, or either phthalonitrile or its derivatives with a copper-containing substance, in a reaction solvent by heating characterized in that an alkylxylene ingredient having a branched C4 side-chain represented by the following formula (1) is used as the reaction solvent:

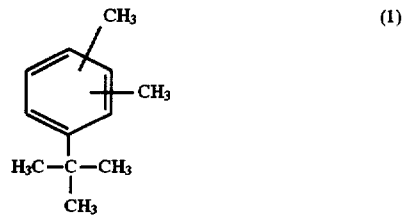

(1)

The second aspect of the present invention relates to a reaction solvent for producing copper phthalocyanine pigments which comprises a compound represented by the following formula (1):

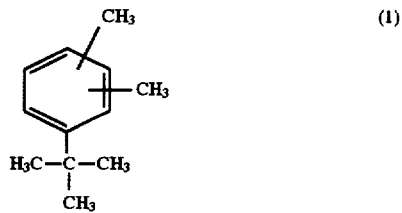

(1)

Hereinunder, the present invention will now be described in more detail.

Production of copper phthalocyanine pigment according to the present invention is carried out by supplying phthalic anhydride or its derivatives as a reacting substance. Examples of derivatives of phthalic anhydride include phthalic acid diamide, phthalamino acid, phthalimide, halogenated nuclear substitution products in which a halogen atom such as chlorine and bromine substitutes for an atom or an atomic group of benzene nucleus, and alkyl nuclear substitution products in which an alkyl group such as methyl and ethyl substitutes for an atom or an atomic group of benzene nucleus. That is to say, phthalic anhydride and its derivatives, phthalonitrile and its derivatives and the like, which will be noted below, can have a substituent corresponding to a desired type of copper phthalocyanine pigments.

As a substitute for urea, biuret, triuret and the other derivatives of urea are applicable to the present invention. Examples of copper-containing substances include copper and cuprous salts such as copper chloride, copper sulfate and copper acetate.

In addition, phthalonitril and its derivatives such as phenylphthalonitrile can be used in the present invention, in which case they are reacted with copper-containing substances. Examples of copper-containing substances include copper and cuprous salts such as copper chloride, copper sulfate and copper acetate in the same manner as the above.

In each case, although a catalyst is not essential for the present invention, but molybdenum compounds such as molybdenum oxide, ammonium molybdate and molybdenum carbonyl, arsenic compounds such as arsenic oxide and boric acid can be used as a catalyst.

The above ingredients are used in the following proportion, that is, in case of using phthalic acid or its derivatives 10–30mol % of the copper-containing substance such as copper and a cuprous salt, 50–500mol % of ureas, 1–10 times by weight of a reaction solvent of the present invention and 0.1 times by weight of a catalyst, which is added according to need, to phthalic acid or one of its derivatives, and in case of using phthalonitrile or its derivatives 10–30 mol % of the copper-containing substance such as copper and a cuprous salt, 1–10 times by wight of a reaction solvent used for the present invention and 0.1 times by weight of a Catalyst, which is added according to need, to phthalonitrile or one of its derivatives such as phenyl phthalonitrile.

The present invention uses a tertiary-butyl-xylene represented by the above formula (1) as a reaction solvent. Examples of alkylxylenes having a branched C4 side-chain of a specific structure include tertiary-butyl-o-xylene, tertiary-butyl-m-xylene, tertiary-butyl-p-xylene, each of which is derived from o-xylene, m-xylene and p-xylene, respectively, through tertiary-butylation. Among them, tertiary- butyl-o-xylene is most preferable because it can be obtained simply, easily and at a low cost besides.

The process for producing the above-noted tertiary-butyl-xylene is not limited to any particular one, and every tertiary-butyl-xylene produced by well-known processes can be used. For example, tertiary-butyl-xylenes produced by the process of tertiary-butylation reaction of o-, m-, p-xylene or mixtures thereof with isobutylene in the presence of catalyst such as aluminum chloride and boron fluoride can also be used.

In particular, the compounds used for the present invention are exemplified by those tertiary-butyl-xylenes represented by the following formula (1a), (1b) and (1c):

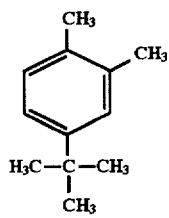

(1a)

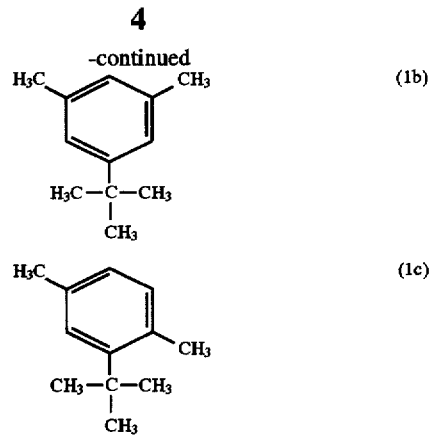

In the present invention, each of the above tertiary-butyl-xylenes can be used independently or in the form of a mixture according to need. Specifically, a reaction is progressed by first introducing either phthalic anhydride or its derivatives, urea and a copper-containing substance, or either phthalonitrile or its derivatives and a copper-containing substance into the above solvent and then heating the mixture. The order of adding each of the reaction ingredients including the reaction solvent is not particularly restricted. Normally they are supplied to a reaction system at the same time.

The solvents used for the present invention can be mixed with other well-known solvents according to need, in which case although every well-known solvent is applicable, it is preferable that are selected solvents of which boiling points are close to those of the solvents for use in the present invention.

In a case where alkylxylenes having a branched C4 side-chain of a specific structure are used in the present invention, it is not necessary to apply any special pressure to a reaction equipment in order to secure a reaction temperature during the production of copper phthalocyanine pigments, and consequently, it is also not necessary to provide any special incidental device to the equipment. Moreover, the use of alkylxylenes makes it easy to secure one's safety because there is no need for treating combustible material at an elevated temperature and pressure. The solvents which can improve the safety during the operation of equipment are very useful from the view point of practical use.

In addition, alkylxylenes used in the present invention having a branched $C_4$ side-chain of a specific structure serve to produce a pigment having an improved yield to the amount of ingredients charged (charge stock) as compared with solvents having the other skeletal structure, and therefore, they are preferable as a practical solvent. The reason why the yield is improved has not been proved yet, but it is thought that the larger number of alkyl group substituted for the atom or atom group of benzene nucleus and the highly branched chain of the group enhance the solvency of the ingredients and intermediate products, which allows acceleration of the formation reaction of pigment.

The present invention is carried out by first charging ingredients, a reaction solvent and a catalyst, if necessary, in a pressure container such as an autoclave, then reacting them by heating while stirring.

The reaction temperature is not particularly restricted, and it can be selected according to requirements within the range of, for example, 130°–300° C., preferably 150°–300° C. Use of the solvent in the present invention makes it possible to progress the reaction at its own pressure (autogenously), that is, without any special pressure applied. Needless to say, it is possible to pressurize by introducing an inert gas etc. and the magnitude of the pressure is not particularly restricted, for example, a pressure of 30 kg/cm$^2$ or less can be selected according to requirement.

The reaction time is not restricted either, but normally the reaction is completed in the range of 30–200 minutes.

After the reaction is completed, the aimed copper phthalocyanine can be obtained by neutralizing and washing the reaction product with a water according to the usual method. The thus obtained copper phthalocyanine may be modified, for example halogenated, by well-known method according to requirement, if necessary.

DESCRIPTION OF THE PREFERRED EMBODIMENTS

The present invention will now be described in more detail by referring to the following Examples and Comparative Examples.

[Example of production of reaction solvent]
Production of tertiary-butyl-xylenes 530 g of mixed xylene consisting of o-, m-, p- xylene and 3 g of aluminum chloride anhydride as an acid catalyst were introduced into a reaction container equipped with a stirrer and maintained 10° C. or less by cooling with ice, after which 280 g of isobutylene was directly blown into the reaction solution to be reacted under an atmospheric pressure. After the catalyst was removed from the reaction mixture by filtration under a reduced pressure, 763 g of a distilled fraction (94.1% yield) having a distillation temperature range of 120°–128° C. were obtained at a reduced pressure of 50 mmHg.

This distilled fraction was subjected to tests for mass spectrum, $^1$H and $^{13}$C-NMR analysis, and as the results of these analysis, found to be a mixture consisting of three types of tertiary-butylated compounds derived from xylenes (mainly tertiary-butyl-o-xylene and the rest including tertiary-butyl-m-xylene and tertiary-butyl-p-xylene).

Hereinafter this mixture will be referred to as Reaction solvent 1.

In Examples and Comparative Examples mentioned below, the following reaction solvents were used. Those other than the Reaction solvent 1 are guaranteed reagents.

Reaction solvent 1: solvent produced according to the above
Reaction solvent 2: isopropylxylene
Reaction solvent 3: secondary-butyl-xylene
Reaction solvent 4: tertiary-butyl-benzene

[Production of copper phthalocyanine]

EXAMPLES AND COMPARATIVE EXAMPLES 21.0 g of phthalic anhydride, 23.0 g of urea, 3.6 g of cuprous chloride anhydride, 0.007 g of ammonium molybdate and each of 100 g of Reaction solvents 1–4 were supplied respectively to 300 ml of four-necked flasks equipped with a reflux condenser, stirrer, thermometer and heating apparatus. The reactions of these mixtures thus supplied were continued for 2 hours while being maintained 180°–185° C. in either case. In the case of Reaction solvent 4, the reaction temperature was in itself the reflux temperature. In every case, the flask was open type equipped with the reflux condenser and therefore, quite a little amount of vapor of the reaction solvent having vaporized during the reaction was kept in contact with air while it was being condensed and refluxed through the reflux condenser.

After the reaction was completed, the reactant was first cooled and recovered by filtration under a reduced pressure, then it was filtrated out via washing twice in 400 g of methanol. After the solvent was removed, the reactant was boiled and washed in 4 lit. of a 2% sodium hydroxide aqueous solution for 1 hour and underwent filtration, after which the reactant was repeatedly washed with a hot water until the hot water was neutralized. Then it was boiled and washed in 2 lit. of a 2% hydrochloric acid aqueous solution, and underwent filtration and a hot water washing until the hot water was neutralized just in the same manner as above, thereby obtaining blue colored powders of copper phthalocyanine. The pigment thus obtained was used for the following brightness test after being dried with a reduced pressure drier at 85°–90° C.

[Brightness test]

12 g of the resultant pigment, 56 g of coconut oil-modified alkyd resin (33% in oil length, 60% in xylene solution), 28 g of melamine resin and 10 g of xylene were introduced into a 300cc-earthen rotary ball mill and kneaded for 5 hours to prepare a pigment dispersing paint.

The pigment dispersing paint thus obtained was applied to white woodfree paper having a thickness of 0.2 mm with an applicator having a coating thickness of 10 mil, after which the paint was subjected to hot-air drying and baking treatments at 120° C. Then, the reflectance of the surface to which pigment was applied was measured to determine the depth of the hue of the surface. The measurement was carried out by using a wave length of 610 nm and the value of the reflectance of the white woodfree paper as a 100% standard.

The yield of the pigment and the results of the brightness test are shown in Table 1.

TABLE 1

| Reaction solvent | Yield of pigment (gr) | Depth of the surface * |
|---|---|---|
| 1 | 19.7 | 4.6 |
| 2 | 16.8 | 4.9 |
| 3 | 19.6 | 6.7 |
| 4 | 13.3 | 8.2 |

*: The values represent the depth of the hue of the surface to which pigment was applied, and the smaller value shows that the pigment has higher brightness.

Effects of the Invention

In a case where alkylxylenes having a branched C4 side-chain of a specific structure of the present invention are used, it is not necessary to apply any special pressure to the reaction equipment to secure a reaction temperature during the production of copper phthalocyanine pigment, and consequently, it also becomes possible not to provide the reaction equipment with any special incidental device. Moreover, the use of alkylxylenes makes it easier to secure one's safety because there is no need for treating combustible material at an elevated temperature and pressure.

In addition, alkylxylenes having a branched $C_4$ side-chain of a specific structure used in the present invention make it possible to produce a pigment having an excellent brightness and an improved yield to the amount of ingredients charged and therefore, they are preferable as a practical solvent as compared with solvents having the other skeletal structure, for example, isopropylxylene, secondary- butyl-xylene, tertiary-butyl-benzene, tertiary-amyl-benzene and the like.

What is claimed is:

1. A process for producing copper phthalocyanine pigments which comprises reacting either phthalic anhydride or its derivatives with urea and a copper-containing substance, or either phthalonitrile or its derivative with a copper-containing substance in a reaction solvent by heating characterized in that an alkylxylene ingredient having a branched C4 side-chain represented by the following formula (1) is used as the reaction solvent:

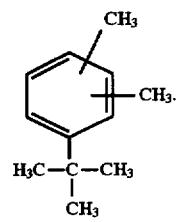

(1)